US010218081B2

(12) United States Patent
Pera et al.

(10) Patent No.: US 10,218,081 B2
(45) Date of Patent: Feb. 26, 2019

(54) MICROWAVE SYSTEM

(71) Applicant: Ubiquiti Networks, Inc., New York, NY (US)

(72) Inventors: Robert J. Pera, San Jose, CA (US); John R. Sanford, Encinitas, CA (US)

(73) Assignee: Ubiquiti Networks, Inc., New York, NY (US)

(*) Notice: Subject to any disclaimer, the term of this patent is extended or adjusted under 35 U.S.C. 154(b) by 0 days.

(21) Appl. No.: 16/007,758

(22) Filed: Jun. 13, 2018

(65) Prior Publication Data

US 2018/0301813 A1 Oct. 18, 2018

Related U.S. Application Data

(63) Continuation of application No. 14/192,813, filed on Feb. 27, 2014, now Pat. No. 10,027,034, which is a continuation of application No. 13/783,272, filed on Mar. 2, 2013, now Pat. No. 8,698,687, which is a continuation of application No. 12/477,998, filed on Jun. 4, 2009, now Pat. No. 8,466,847.

(51) Int. Cl.

| | |
|---|---|
| ***H01Q 19/13*** | (2006.01) |
| ***H01Q 15/16*** | (2006.01) |
| ***H01Q 1/42*** | (2006.01) |
| ***H01Q 19/30*** | (2006.01) |
| ***H04B 1/38*** | (2015.01) |
| ***H01Q 1/22*** | (2006.01) |

(52) U.S. Cl.
CPC ........... *H01Q 15/16* (2013.01); *H01Q 1/2291* (2013.01); *H01Q 1/42* (2013.01); *H01Q 19/134* (2013.01); *H01Q 19/30* (2013.01)

(58) Field of Classification Search
CPC ...... H01Q 1/2291; H01Q 19/28–19/32; H01Q 19/134; H01Q 15/16; H04B 1/38
See application file for complete search history.

(56) References Cited

U.S. PATENT DOCUMENTS 2,627,028 A * 1/1953 Nowak ................. G01S 13/422 343/761
3,742,512 A * 6/1973 Munson ................. H01Q 19/15 343/814
5,523,768 A * 6/1996 Hemmie ................ H01Q 1/247 343/700 MS

* cited by examiner

*Primary Examiner* — Jessica Han
*Assistant Examiner* — Amal Patel
(74) *Attorney, Agent, or Firm* — Pete Tormey; Antero Tormey & Petrin

(57) ABSTRACT

A microwave system comprising a center fed parabolic reflector; a radio transceiver, said transceiver disposed on a circuit board and coupled to a radiator, said radiator disposed on the circuit board and extending orthogonally from a surface of the circuit board. Embodiments also include directors on the circuit board and a sub-reflector comprising a thin plate disposed on a weather proof cover and said sub-reflector having a substantially concave surface with a focus directed towards the radiator. The circuit board may be physically integrated within the feed mechanism of the center fed parabolic reflector and the radio transceiver is configured to provide OSI layer support.

6 Claims, 7 Drawing Sheets

MICROWAVE SYSTEM

PRIORITY

This application is a continuation of co-pending application Ser. No. 14/192,813 filed Feb. 27, 2014 which in turn is a continuation of Ser. No. 13/783,272 entitled Microwave System filed Mar. 8, 2013 (now U.S. Pat. No. 8,698,687) which in turn is a continuation of application Ser. No. 12/477,998, (now U.S. Pat. No. 8,466,847) filed on Jun. 4, 2009 by the same inventors which, along with their incorporated documents, are incorporated herein by reference as if fully set forth in this disclosure.

FIELD OF THE INVENTION

This invention generally relates to wireless communications, and more specifically, to microwave antennas and microwave radio equipment.

BACKGROUND OF THE INVENTION

The core elements of a microwave system include a radio transceiver, an antenna, an antenna feed mechanism, and the necessary RF cabling to connect these elements and one or more client stations. Client stations are connected to the radio transceiver via digital cables. The performance of the microwave antenna system is based upon the characteristics of the aforementioned elements and the efficiency of integration of these elements into a system. There have been many improvement of microwave system over the years, and the demand for microwave systems continues to grow, in part due to the large demand for internet service in remote areas of the world. Thus, there is a motivation to have further improvements in the cost and performance of microwave systems.

Some of considerations in an improved cost and performance microwave system include:

Lower cost via a reduced component count and a reduction or elimination of the expensive RF cable.

Higher performance due to reduction of RF cable and RF connector losses that effect both the transmit power and receive noise figure.

Higher reliability due to a reduced part count and RF connectors.

Improved ease of use when the user set-up only has a digital interface instead of having both an RF and digital interfaces.

Improved ease of use since there are fewer parts required for the set-up of a radio link.

Improved ease of use and functionality when the radio transceiver and antenna is powered by a digital cable.

Accordingly, the aforementioned factors provide motivation for improvements in the design of microwave systems.

SUMMARY

The present invention offers significant improvements in the performance, cost, reliability and ease of use of a microwave system. The core elements of a microwave system include a radio transceiver, an antenna, an antenna feed mechanism, and the necessary RF cabling to connect these elements. In the present invention, an antenna feed system is described. The antenna feed system comprises the radio transceiver, which is integrated with the antenna feed mechanism and the antenna conductors. Many benefits result from this integration, including the elimination of RF cabling and connectors. In the exemplary embodiment, the antenna feed assembly further comprises connectivity for a digital signal interface; antenna feed pins, director pins and sub-reflectors. Typically, these elements are located on a printed circuit board and housed in weather proof housing.

The design of the antenna feed assembly requires the specification of the location, dimensions, and shapes of the one or more antenna feed pins, the one or more director pins and the one or more sub-reflectors. To facilitate and optimize the design and performance of the entire antenna system, 3D finite element method (FEM) software and numerical optimization software is utilized. The antenna system comprises the antenna feed system, its associated housing, and a parabolic reflector. By mounting the antenna feed pins and director pins perpendicular to a printed circuit board, the performance of the antenna system is significantly improved.

A microwave system is also described that comprises a center fed parabolic reflector and a radio transceiver, wherein the radio transceiver is physically integrated with a center feed parabolic reflector, and wherein the radio transceiver is powered through a digital cable. Many benefits result from this integration, including the elimination of RF cabling and connectors in the microwave system. In one embodiment, the antenna feed assembly further comprises connectivity for a digital signal interface; antenna feed pins, director pins and sub-reflectors. Typically, these elements are located on a printed circuit board and housed in weather proof housing.

In one embodiment, the radio transceiver has a connector for a Ethernet cable that receives not only the digital signals, but also the power for the radio transceiver and the center fed reflector. The Ethernet cable couples to a passive adapter, which in trims couples to a client station, wherein the passive adapter is powered by a USB cable that is also coupled to the client station. The passive adapter injects power in the portion of the Ethernet cable that couples to the radio transceiver. The length of the Ethernet cable is selected such that there is sufficient power to support the radio transceiver and to support the transmission of the digital signal to the radio transceiver. This embodiment may support a radio transceiver that incorporates a radio gateway with OSI layer 1-7 capabilities.

In another embodiment, the radio transceiver has a connector for a USB cable that receives not only the digital signals, but also the power for the radio transceiver and the center fed parabolic reflector. The USB cable couples to a USB repeater, which in turns couples to a client station. The length of the USB cables is selected such that there is sufficient power to support the radio transceiver and to support the transmission of the digital signal to the radio transceiver. This embodiment may support a radio transceiver that incorporates a USB client controller, supporting OSI layer 1-3.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Although described in the context of an IEEE 802.11 Wi-Fi microwave system, the systems disclosed herein may be generally applied to any mobile network.

An exemplary embodiment of the present invention is based upon parabolic reflectors, which are well known in the industry. A parabolic reflector is a parabola-shaped reflective device, used to collect or distribute energy such as radio waves. The parabolic reflector functions due to the geometric properties of the paraboloid shape: if the angle of incidence to the inner surface of the collector equals the angle of reflection, then any incoming ray that is parallel to the axis of the dish will be reflected to a central point, or "locus". Because many types of energy can be reflected in this way, parabolic reflectors can be used to collect and concentrate energy entering the reflector at a particular angle. Similarly, energy radiating from the "focus" to the dish can be transmitted outward in a beam that is parallel to the axis of the dish. These concepts are well-known by one skilled in the art.

Definitions for this detailed description are as follows:

Antenna feed—An assembly that comprises the elements of an antenna feed mechanism, an antenna feed conductor, and a associated connector.

Antenna feed system—A system comprising an antenna feed and a radio transceiver.

Antenna system—A classical antenna system comprises the antenna feed and an antenna, such as parabolic reflector 101. In the present invention, a radio transceiver is integrated with the antenna feed, so the antenna system comprises an antenna feed system and an antenna.

Center fed parabolic reflector—a parabolic reflector, and an antenna feed, wherein the signal to the antenna feed is "feed" through the center of the parabolic antenna.

Microwave system—A system comprising an antenna system, a radio transceiver, and one or more client station devices. The radio transceiver may be integrated with the antenna system.

Figure 1:
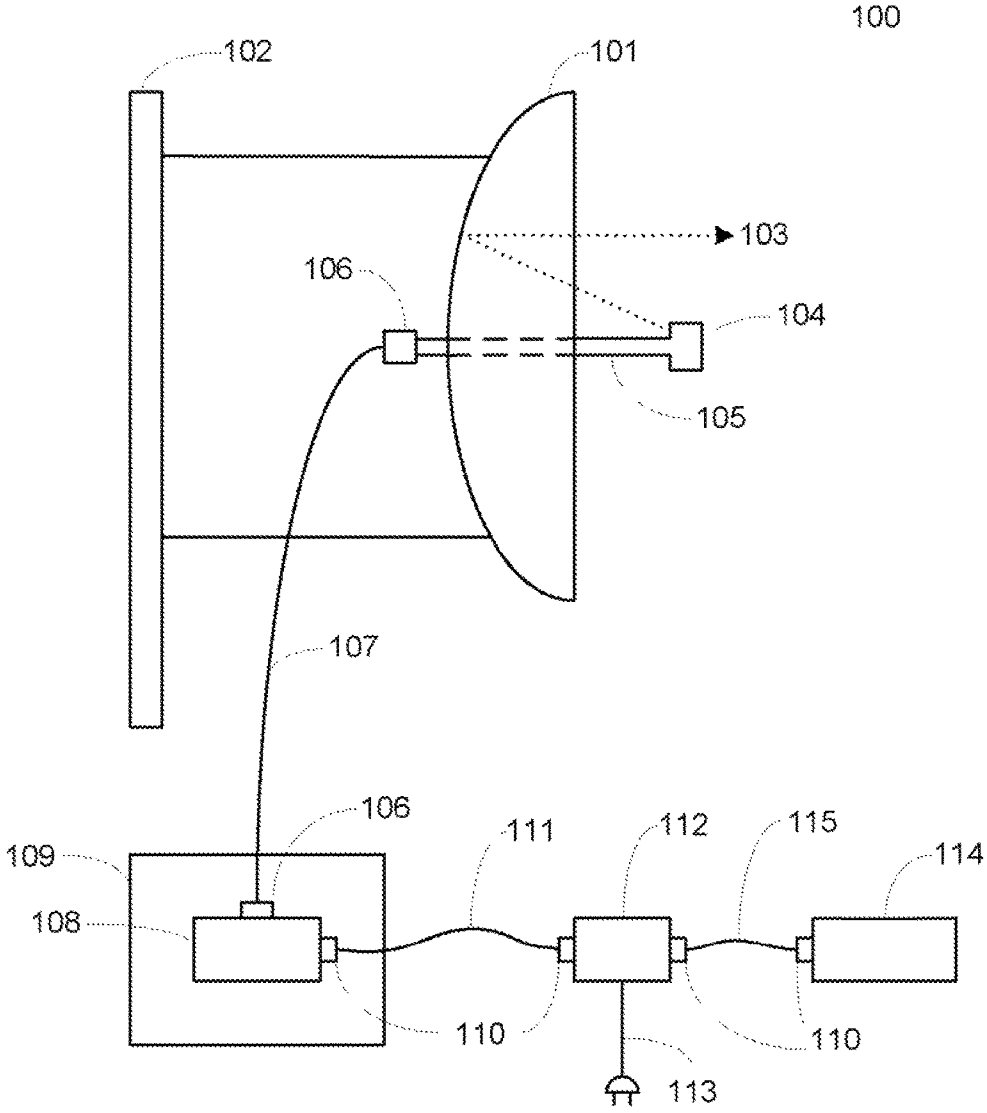
FIG. 1 Prior Art
FIG. 1 illustrates a prior art design of a microwave system.

FIG. 1 is a diagram of a prior art design 100 of the microwave system and a client station. The system consists of a parabolic reflector 101, which is supported by a mounting bracket 102. The parabolic reflector 101 reflects a RF signal 103 that is emitted from the antenna feed mechanism 104. The antenna feed mechanism 104 receives the RF signal via the antenna feed conductor 105. As illustrated in FIG. 1, the antenna feed conductor 105 is coupled to an RF connector 106. In turn, the RF connector 106 is coupled to a coaxial cable or equivalent 107. The coaxial cable 107 has a RF connector 106 on each end of the cable.

The other end of the coaxial cable 107 connects to the radio transceiver 108, which is located in a weatherproof housing, 109. This weatherproof housing 109 may be a housing just for the radio transceiver 108, as illustrated in FIG. 1. Alternative, the weather proof housing 109 may be a housing suitable to enclose several electronic devices, including client station 114. This latter configuration is not shown.

The radio transceiver 108 converts the RF signal to a baseband signal, based upon the modulation/demodulation algorithms implemented in the radio transceiver 108. For example, the radio transceiver may implement a IEEE 802.11 transceiver. In this conversion, the baseband signal is encoded in the modulation process and becomes a non-baseband signal. Conversely, the non-baseband signal is decoded in the demodulation process and becomes a baseband signal. As noted above, the radio transceiver 108 supports radio frequency (RF) signals, but other embodiments of the radio transceiver 108 may support other types of non-baseband signals such as light or sound.

The radio transceiver 108 has a digital connector 110 that provides the input/output connectivity for a digital signal. The digital connector 110 may be, but is not limited to, an Ethernet connector or a USB connector.

As illustrated in FIG. 1, for one embodiment, a digital cable 111 is an Ethernet cable that connects from the radio transceiver 108 to a power over Ethernet (POE) device 112. The POE device 112 injects power on the digital cable 111, such that digital cable 111 supplies power to the radio transceiver 108. The POE 112 receives power from an AC power source 113. The digital signal is coupled on digital cable 115 from POE 112 to a client station 114. The client station 114 may be a client computer such as a laptop.

There are a number of issues to be addressed in an improved performance and reduced cost microwave system.

First, as illustrated in the prior art microwave system and client station of FIG. 1, the RF transceiver 108 is located a distance from the antenna feed conductor 105. As a minimum, a RF cable 107 and four RF connectors 106 are required. For longer distances a RE bi-directional amplifier is also required. Thus, there would be considerable benefits if the radio transceiver 108 was located near the antenna feed mechanism 104 or ideally physically integrated with the antenna feed mechanism 104.

Second, a basic antenna feed system has a number of design and selection considerations. In FIG. 1, the antenna feed system includes the antenna feed conductor 105, including an RF connector 106, plus the antenna feed mechanism 104. In the fundamental design, an antenna feed system is placed with its phase center at the focus of the parabola. Ideally, all of the energy radiated by the antenna feed will be intercepted by the parabola and reflected in the desired direction. To achieve the maximum gain, this energy would be distributed such that the field distribution over the aperture is uniform. Because the antenna feed is relatively small, however, such control over the feed radiation is unattainable in practice. Some of the energy actually misses the reflecting area and is lost; this is commonly referred to as "spillover". Also, the field is generally not uniform over the aperture, but is tapered, wherein the maximum signal at the center of the reflector, and less signal at the edges. This "taper loss" reduces gain, but the filed taper provides reduced side-lobes levels.

Third, one of the simplest antenna feeds for a microwave system is the dipole. Due to its simplicity, the dipole was the first to be used as a feed for reflector antennas. While easy to design and implement, the dipole feed has inherently unequal E and H plane radiation patterns, which do not illuminate the dish effectively and thus reduces efficiency. Another disadvantage of the dipole antenna feed for some applications is that due to unequal radiation patterns, cross polarization performance is not optimal. Accordingly, modification to a simple dipole antenna feed is required to achieve optimum performance, yet cost effective approach.

Figure 2:
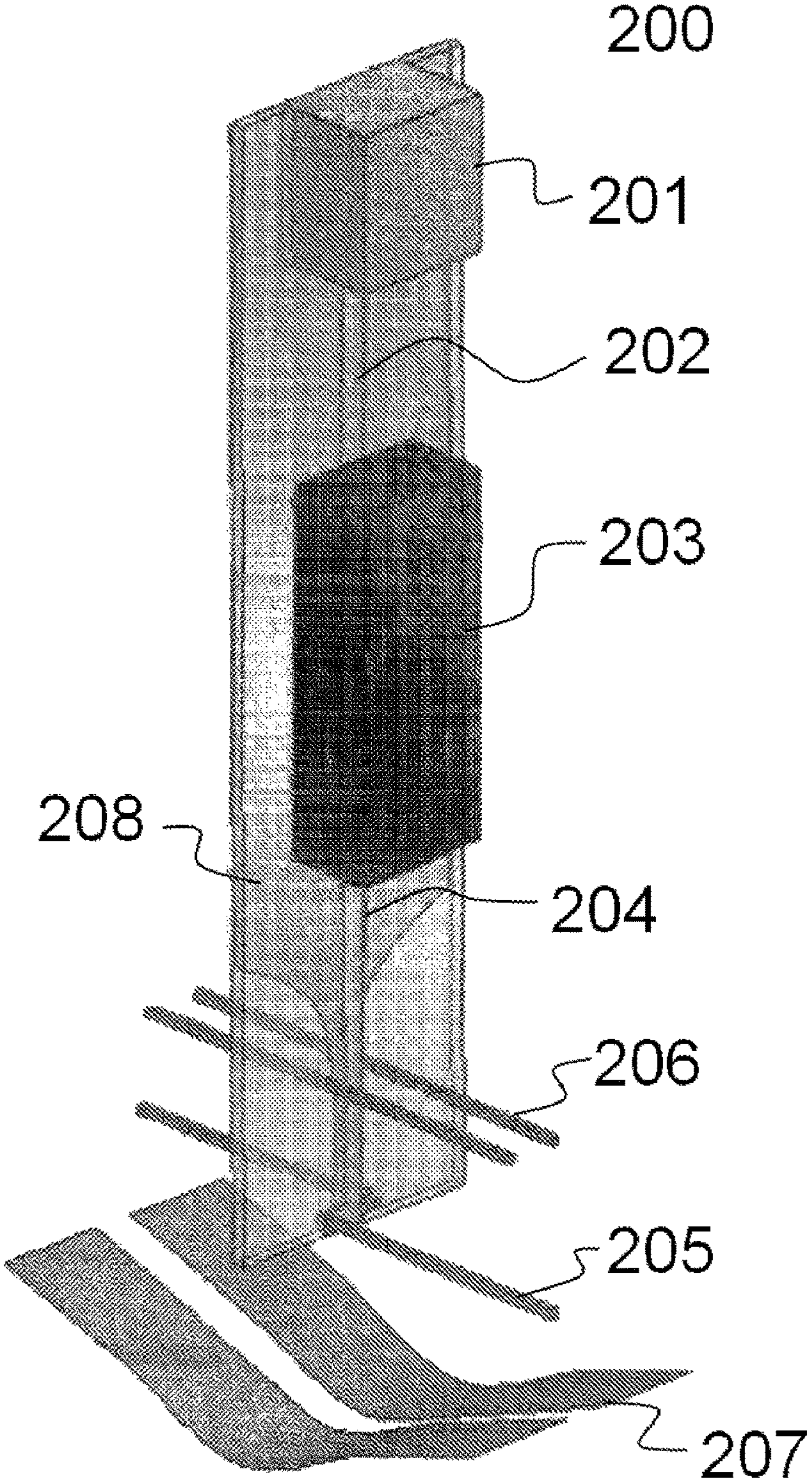
FIG. 2 illustrates an exemplary antenna feed system in accordance with an embodiment of the present invention.

FIG. 2 illustrates an exemplary antenna feed system 200 in accordance with an embodiment of the present invention. As illustrated, the functions of the radio transceiver 108 are integrated with the functions of the antenna feed conductor 105, and the functions of the conventional antenna feed mechanism 104. The exemplary antenna feed system 200 is located in the same position relative to a reflective antenna as the conventional antenna feed mechanism 104. The exemplary antenna feed system 200 is assembled on a common substrate, which may be a multi-layer printed circuit board 208, as illustrated in FIG. 2. The antenna feed system 200 comprises a digital connector 201 which is equivalent to digital connector 110 of FIG. 1. This digital connector 201 may be an Ethernet or USB connector or other digital connector. A digital signal from a client station, such as client station 114, is coupled to the digital connector 201 on a digital cable. To power the radio transceiver in the antenna feed system, the digital cable includes a power component. The power component may be provided on an Ethernet cable, a USB cable, or other equivalent digital cable.

Figure 3:
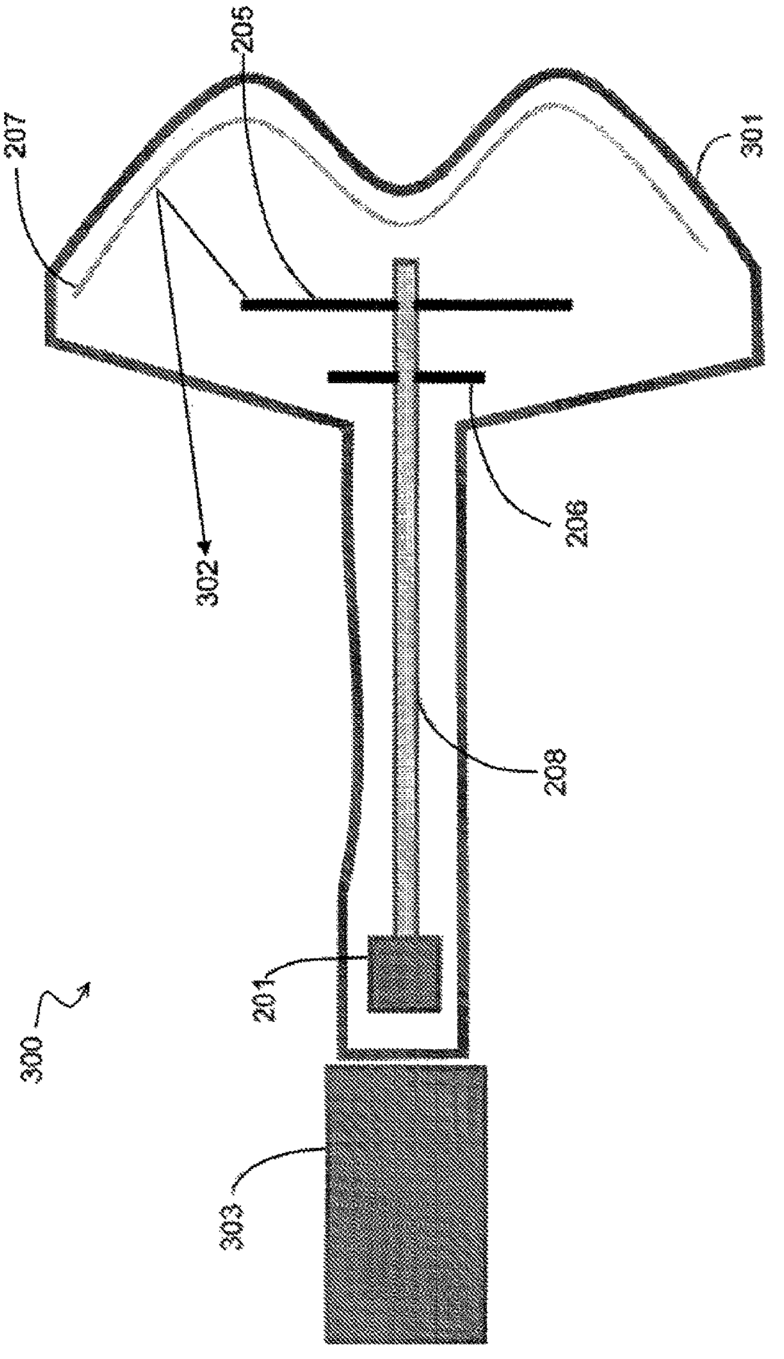
FIG. 3 illustrates the antenna feed system in a weather proof housing with an antenna tube in accordance with an embodiment of the present invention.

FIG. 3 illustrates antenna element 300 comprising the antenna feed system in a housing with an antenna tube 303. The housing may be weather proof housing as illustrated in FIG. 3 as a plastic housing 301 that encloses the elements of the antenna feed system. The antenna feed system, its associated housing, and a parabolic reflector is an antenna system.

As illustrated, the antenna feed system comprises the digital connector 201, the printed circuit board 208, the antenna feed pins 205, the director pins 206, and the subreflector 207. Per FIG. 3, the sub-reflector 207 reflects radiated waves 302 back towards the reflective antenna (not shown). The plastic housing 301 may conform to the shape of sub-reflector 207. As an option, the plastic housing 301 permits interchangeability of the sub-reflector 207.

The tube 303 may be adjusted to various lengths in order to accommodate reflectors of different sizes. A digital cable, equivalent to digital cable 111, may be routed through the tube 303 and connected to digital connector 201. Digital connector 201 may have a weatherized connector, such as a weatherized Ethernet or USB connector.

Referring back to FIG. 2, the digital connector 201 is coupled to a radio transceiver 203 via conductor 202. Connector 202 may be implemented by a metal connector on a printed circuit card 208. The radio transceiver 203 has similar functionality as the radio transceiver 108 of FIG. 1. Accordingly, radio transceiver 203 generates an RF signal that is coupled to an antenna feed conductor 204, which in turn couples to antenna feed pins 205. The antenna feed pins 205 radiate the RF signal 103 to an antenna such as parabolic reflector 101. However, the radiated signal is modified and enhanced by the director pins 206 and the sub-reflectors 207. These components will be further discussed herein.

Figure 4A:
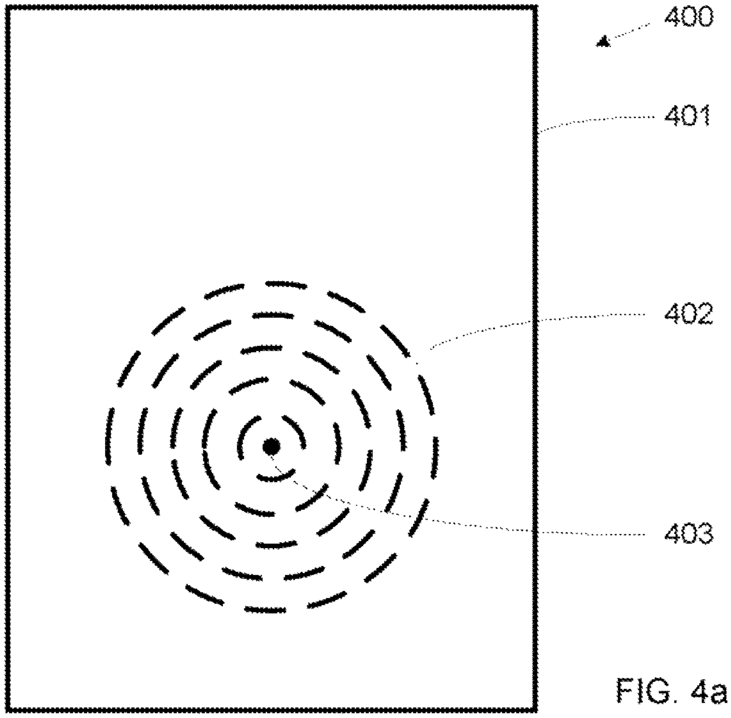
FIG. 4*a* illustrates the wave pattern of an antenna feed pin on the antenna feed system in accordance with an embodiment of the present invention.

As illustrated in FIG. 2, the antenna feed pins 205 comprise two pins that are located on opposite sides of the printed circuit card, and the pins are electrically connected together. FIG. 4*a* illustrates assembly 401 with the radiating patterns 402 from the antenna feed pin 403. In their most fundamental structure the antenna feed pin 403 implements a half wave length dipole. However, the optimum system design with the inclusion of the director pins 206 and the sub-reflector 207 results in a modified design from that of a half-wave length dipole.

Figure 4B:
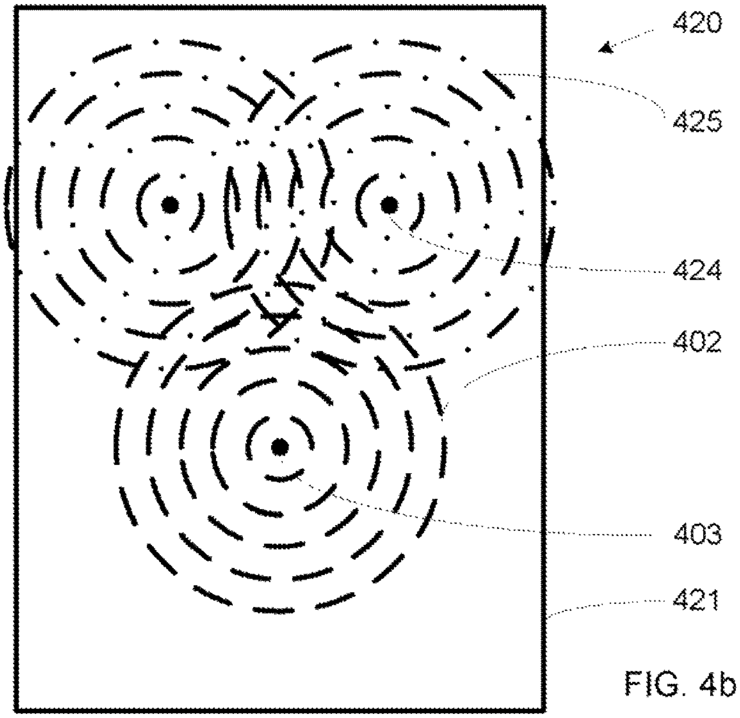
FIG. 4*b* illustrates the individual wave pattern of the antenna feed pins and the director pins on the antenna feed system in accordance with an embodiment of the present invention.
Figure 4C:
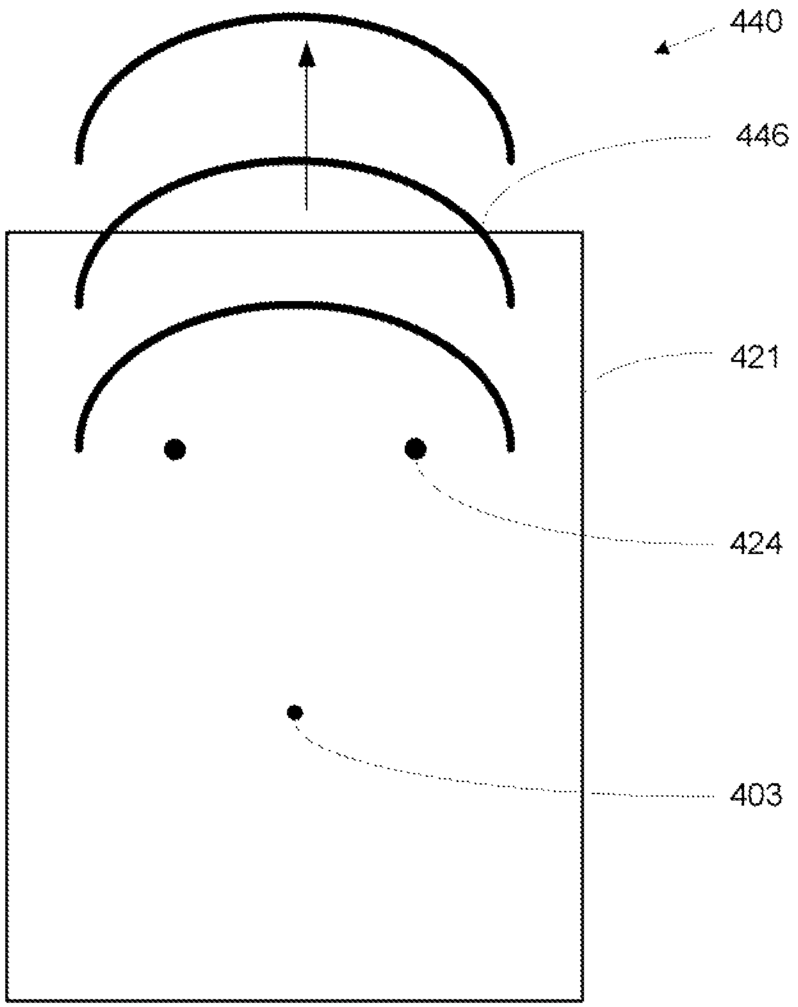
FIG. 4*c* illustrates the superposition of the antenna feed pins and the director pins on the antenna feed system in accordance with an embodiment of the present invention.

The director pins 206 are known in the industry as passive radiators or parasitic elements. These elements do not have any wired input. Instead, they absorb radio waves that have radiated from another active antenna element in proximity, and re-radiate the radio waves in phase with the active element so that it augments the total transmitted signal, as illustrated in FIGS. 4*b* and 4*c*. Per FIG. 4*a* and element 400, assembly 401 comprises an antenna feed pin 403 that radiates circular waves 402. As illustrated in FIGS. 4*b* and 4*c*, assembly 421 comprises an antenna feed pin 403 and two director pins 424. Per FIG. 4*b* and element 420, these circular waves 402 reach the proximity of director pins 424 and the director pins 424 generate re-radiated waves 425. The result is that the energy is better focused towards the reflective antenna, as illustrated in FIG. 4*c* and element 440. Per FIG. 4*c*, the superposition of the radiated waves 402 from the antenna feed pins 403 and the re-radiated waves 425 from the director pins 424 result in highly focused waves 446 that are radiated towards the parabolic reflector (not shown).

An example of an antenna that uses passive radiators is the Yagi, which typically has a reflector behind the driven element, and one or more directors in front of the driven element, which act respectively like the reflector and lenses in a flashlight to create a "beam". Hence, parasitic elements may be used to alter the radiation parameters of nearby active elements.

For the present invention the director pins 206 are electrically isolated in the antenna feed system 200. Alternatively, the director pins 206 may be grounded. For the exemplary embodiment, the director pins 206 comprise two pins that are inserted through the PCB 208 such that two pins remain are each side of PCB 208, as illustrated in FIG. 2. In the exemplary embodiment, the director pins 206 and the antenna feed pins 205 are mounted perpendicular to the printed circuit board 208. Further, these pins may be implemented with surface mounted (SMT) pins.

The perpendicular arrangement of the director pins 206 and the antenna feed pins 205 allows for the transmission of radio waves to be planar to the antenna feed system 200. In this arrangement, the electric field is tangential to the metal of the PCB 208 such that at the metal surface, the electric field is zero. Thus the radiation from the perpendicular pins has a minimal impact upon the other electronic circuitry on PCB 208. Hence, approximately equal F and H plane radiation patterns are emitted that provide for effective illumination of the antenna, thus increasing the microwave system efficiency.

The radiation pattern and parameters are additionally modified by the sub-reflector antenna 207 that is located near the antenna feed pins 205. As illustrated in FIG. 3, the sub-reflector "reflects" radiation back to a reflective antenna (not shown in FIG. 3.) Otherwise, this radiation would not be effectively directed. Accordingly, both the director pins and the sub-reflector modify the antenna pattern and beam width, with the potential of improving the microwave system performance.

The overall performance of the antenna feed system is based upon the design of the antenna feed pins 205, the director pins 206, the sub-reflector 207 and the incorporation of the radio transceiver 203 and digital connector 201. For each of these elements, the location of each element in the antenna feed system is determined, and the dimension and shape of each element is determined. To optimize the performance, these design considerations are matched with the design characteristics of the antenna. To facilitate this complex design, a two-step design process is implemented:

1. Simulation and analysis using 3D electromagnetic finite element method (FEM) software. In the industry, this software is referred to as HFSS, or High Frequency Structure Simulator. HFSS is the industry standard software for S-parameter extraction, Full Wave SPICE™ model generation and 3D electromagnetic field simulation of high-frequency and high-speed components. HFSS™ utilizes a 3D full-wave Finite Element Method (FEM) field solver. HFSS is available from software vendors or may be developed as custom software.

2. Design of the antenna feed system utilizing numerical optimization software. Genetic algorithms are incorporated in this software. As a result of this design step, the optimized physical design is achieved based upon various design parameters.

For the present invention, important design parameters include obtaining an acceptable return loss (i.e. maximize the reflected energy) and obtaining high gain (i.e. maximize the focus of the energy). Some other design considerations could include the radio system standards, including multi-band configurations, antenna configurations, minimizing the form factor, design for easy assembly and manufacturability.

A specific type of parabolic reflector is a grid reflector. A grid reflector offers a small package and light weight design. Hence, they are useful in rural areas where transportation costs are a key factor. Also, grid reflectors with their small form factor and grid antenna are well suited for high wind environments.

An alternative to the parabolic reflector is a corner reflector. A corner reflector is a retro-reflector consisting of three mutually perpendicular, intersecting flat surfaces, which reflects electromagnetic waves back towards the source. The three intersecting surfaces often have square shapes. Corner reflectors are useful if a modest amount of gain is sufficient, and a smaller form actor and lower cost is desired.

Microwave systems gain significant benefits when they are constructed with the aforementioned antenna feed system. For example, with the elimination of RF cables, only digital cables are required for the connection to the center fed parabolic reflector. Thus, installation issues are simplified. Further, there are alternative embodiments that allow the digital cable to also supply the power to the digital transceiver.

Figure 5:
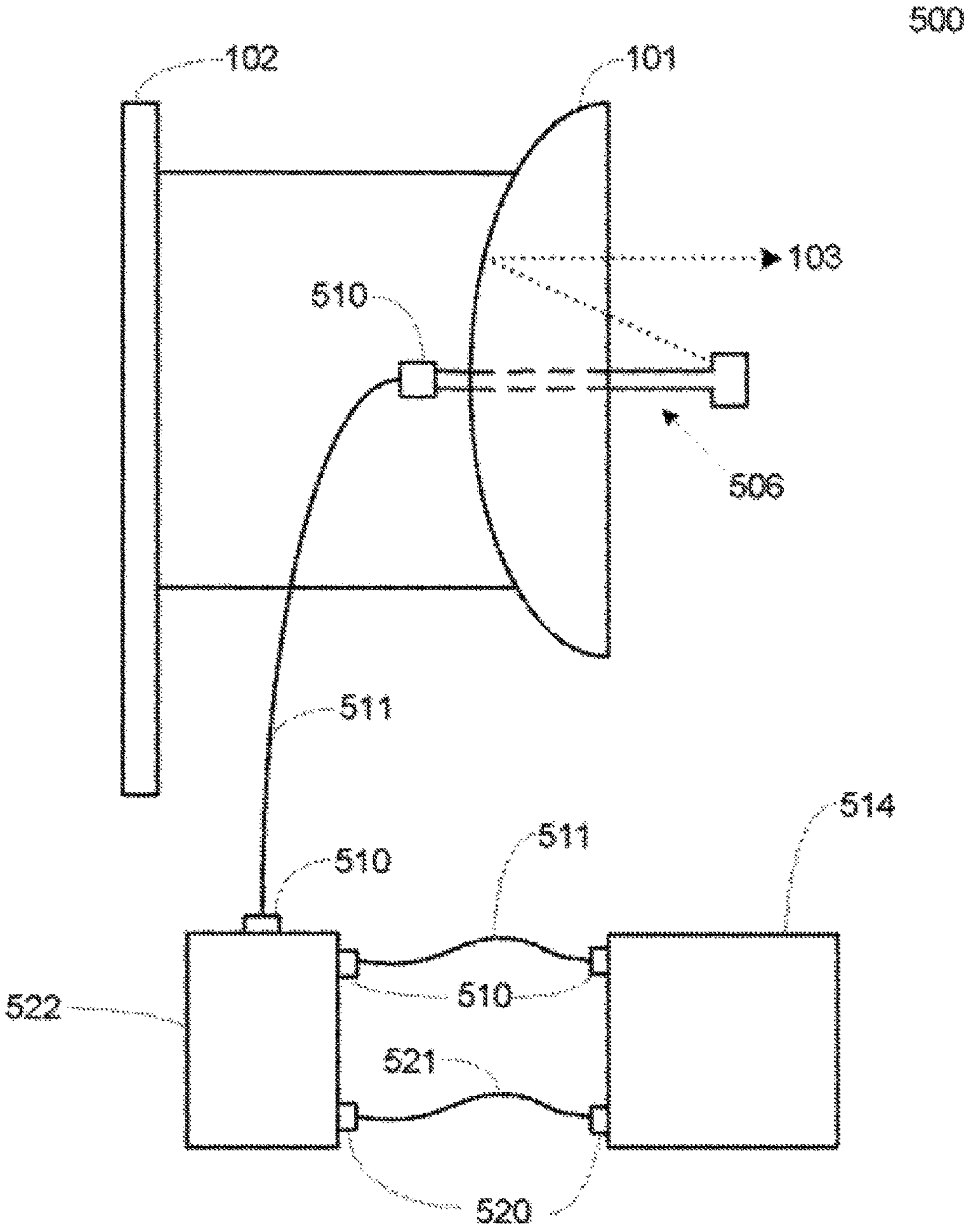
FIG. 5 illustrates a microwave system comprising a center feed parabolic reflector incorporating antenna feed system, wherein an Ethernet cable provides the digital signal and power to the radio transceiver.

One embodiment is microwave system 500 illustrated in FIG. 5. As per FIG. 5, a parabolic reflector 101 is appropriately installed on mounting bracket 102. The parabolic reflector 101 incorporates a center feed assembly as was illustrated in FIG. 3. Antenna element 506 is an embodiment of antenna element 300. Antenna element 506 also incorporates an embodiment of antenna feed system 200 (not shown in FIG. 5). Antenna element 506 comprises a housing and antenna tube as illustrated in FIG. 3.

Antenna element 506 comprises an Ethernet connector 510 that is shown separately for clarity. The digital signal from Antenna element 506 is coupled via an Ethernet cable 511 to a passive adapter 522, which in turn couples the digital signal to a client station 514 via another Ethernet cable 511. Additional Ethernet connectors 510 facilitate the coupling. The passive adapter 522 also comprises a USB connector 520 which is coupled by a USB cable 521 to USB connector 520 on the client station 514. Via the USB cable 520, power is supplied from the client station 514 to the passive adapter 522. In turn, the passive adapter 522 injects power into the portion of the Ethernet cable that couples to antenna element 506. Hence, power for antenna element 506, that comprise a radio transceiver and for the parabolic reflector is supplied by the client station 114.

A typical USB port may supply approximately 500 mw at 5 volts. When this level of current is supplied to the passive adapter 622, then there is sufficient power to support an Ethernet cable of up to 100 meters in length. This means that there is sufficient power to "power" the radio transceiver, and the there is sufficient power to support the transmission of the digital signal to the radio transceiver. Hence, the parabolic reflector 101 may be located up to 100 meters from the passive adapter 522.

In the aforementioned embodiment, the radio transceiver may incorporate a radio gateway with Open Systems Interconnection (OSI) layer 1-7 support. Accordingly, full routing, firewall, network translations and network processing capabilities may be provided. One implementation of the aforementioned radio transceiver is a radio-based Linux RTOS 3 gateway. This functionality is desirable to IT system administrators inasmuch as they may manage the network without distributing the client devices.

Figure 6:
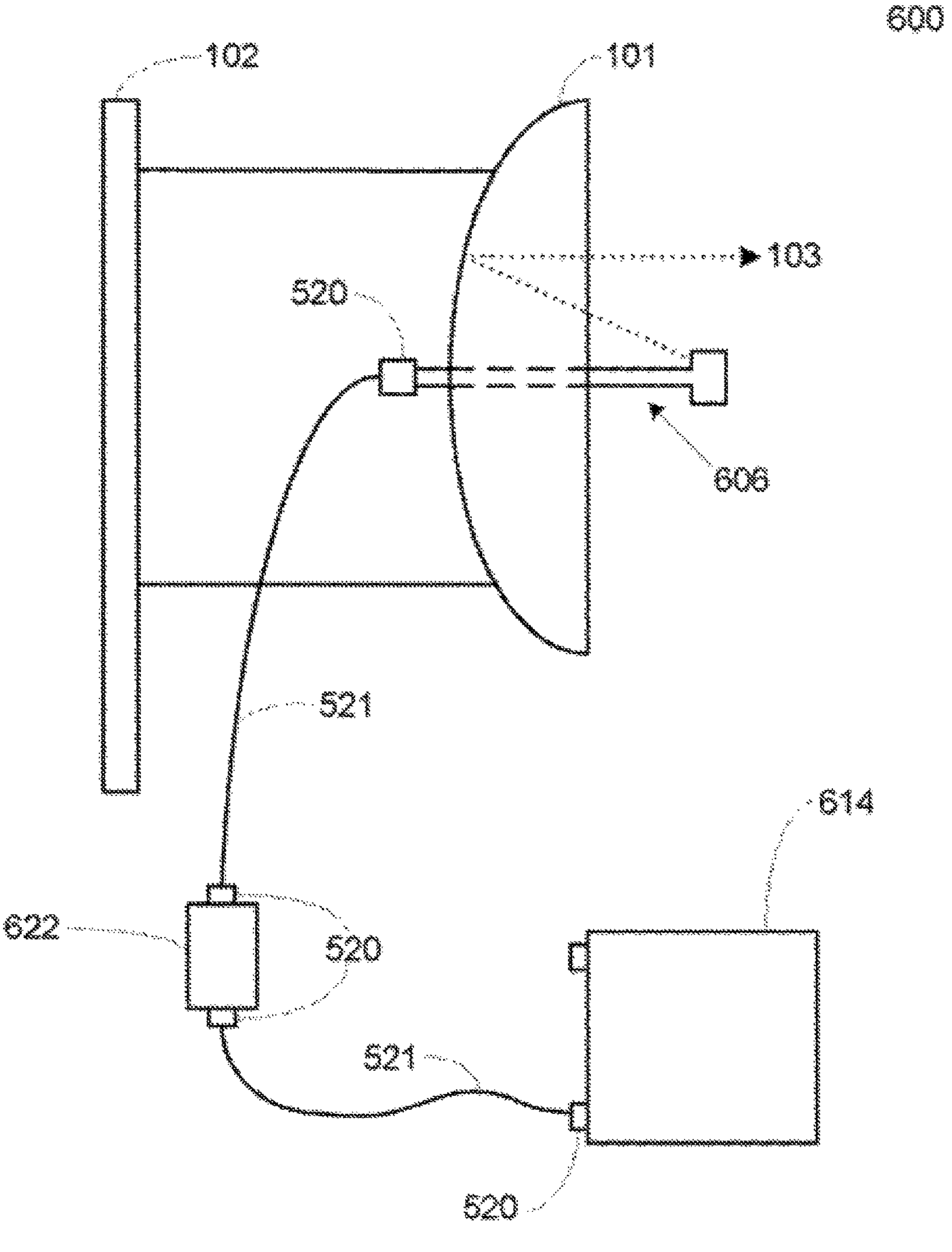
FIG. 6 illustrates a microwave system comprising a center feed parabolic reflector incorporating antenna feed system, wherein a USB cable provides the digital signal and power to the radio transceiver.

An alternative embodiment of the present invention is microwave system 600 as illustrated in FIG. 6. Similar to FIG. 5, microwave system 600 comprises parabolic reflector 101 with mounting bracket 102, and antenna element 606. Antenna element 606 is another embodiment of antenna element 300, as illustrated in FIG. 3. For this embodiment, antenna element 606 has a digital connector that is a USB connector 520 that is shown separately for clarity. Additionally, the radio transceiver is a radio transceiver with a client controller that supports OSI layers 1-3. One implementation is a radio-based windows client device.

Similarly to the microwave system 500, the radio transceiver of microwave system 600 is powered by the digital cable. For microwave system 600, the USB cable 521 provides the digital signal and power to the radio transceiver in the antenna element 606. In this embodiment, the USB cable 521 is coupled from the USB connector 520 of the antenna element 606 to a USB repeater 622. In turn another USB cable 521 is coupled from the USB repeater 622 to a client station 614. Hence, the client station 614 provides the power to the radio transceiver incorporated in antenna element 606.

With the aforementioned embodiment, each of the USB cables is limited in length to approximately 4.5 meters in order to insure sufficient signal performance and power is received by the radio transceiver. This limitation is acceptable in many applications given the significant cost reduction with this embodiment.

While various embodiments of the invention have been described, it will be apparent to those of ordinary skill in the art that many more embodiments and implementations are possible that are within the scope of this invention. For example, any combination of any of the systems or methods described in this disclosure is possible.

We claim:

1. A device comprising:

a center-fed reflector;

an antenna tube disposed along the central axis of the center-fed reflector, said antenna tube including a circuit board, said circuit board having a top surface and a bottom surface;

a first radiator pin disposed on the top surface of the circuit board, and substantially perpendicular to the top surface of the circuit board;

a second radiator pin disposed on the bottom surface of the circuit board and substantially perpendicular to the bottom surface of the circuit board;

said first and second radiator pins, electrically coupled to form a half-wavelength dipole antenna;

a pair of director pins disposed through the circuit board, substantially parallel to the first or second radiator pin;

a pair of substantially similar sub-reflectors disposed on the antenna tube, each of said sub-reflectors having a first concave surface substantially disposed towards the radiator pin, and a radio transceiver disposed on the top surface of circuit board, said radio receiver electrically coupled to the first and second radiator.

2. The device of claim 1 wherein the radio transceiver couples to a client station via an Ethernet cable, wherein the radio receiver receives power through the Ethernet cable.

3. The device of claim 1 wherein the radio transceiver is configured to provide open system interconnection (OSI) layer support.

4. The device of claim 3, wherein the OSI layer support is provided with a gateway.

5. The device of claim 3, wherein the OSI layer support is provided by a client controller.

6. The device of claim 1 further including:

a second sub-reflector disposed on the antenna tube.

* * * * *